(12) United States Patent
Yu et al.

(10) Patent No.: US 11,850,921 B2
(45) Date of Patent: Dec. 26, 2023

(54) VEHICLE WINDOW GLASS, VEHICLE WINDOW GLASS ASSEMBLY AND MANUFACTURING PROCESS THEREOF

(71) Applicant: SAINT-GOBAIN GLASS FRANCE, Courbevoie (FR)

(72) Inventors: Jing Yu, Shanghai (CN); Xiaobing Xu, Shanghai (CN)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 133 days.

(21) Appl. No.: 17/442,504

(22) PCT Filed: Apr. 23, 2020

(86) PCT No.: PCT/CN2020/086300
§ 371 (c)(1),
(2) Date: Sep. 23, 2021

(87) PCT Pub. No.: WO2020/216273
PCT Pub. Date: Oct. 29, 2020

(65) Prior Publication Data
US 2022/0169096 A1    Jun. 2, 2022

(30) Foreign Application Priority Data

Apr. 26, 2019 (CN) .......................... 201910342669.1

(51) Int. Cl.
*B60J 1/00* (2006.01)
*B60R 13/04* (2006.01)
(Continued)

(52) U.S. Cl.
CPC .......... *B60J 1/008* (2013.01); *B29C 45/14491* (2013.01); *B60R 13/04* (2013.01); *B29L 2031/3052* (2013.01)

(58) Field of Classification Search
CPC ..... B60J 1/00; B60J 1/004; B60J 1/006; B60J 1/20; B60J 10/20; B60J 10/30;
(Continued)

(56) References Cited

U.S. PATENT DOCUMENTS 5,398,452 A    3/1995  Schilde et al.
6,467,225 B1 * 10/2002  Shimomura ............... B60J 1/17
                                                        52/204.5
(Continued)

FOREIGN PATENT DOCUMENTS

CN    104354570 A    2/2015
CN    105246723 A    1/2016
(Continued)

OTHER PUBLICATIONS

International Search Report as issued in International Patent Application No. PCT/CN2020/086300, dated Jul. 23, 2020.

(Continued)

*Primary Examiner* — Gregory A Blankenship
(74) *Attorney, Agent, or Firm* — Pillsbury Winthrop Shaw Pittman LLP (57) ABSTRACT

A vehicle window glass includes a glass body provided with a through hole and an insert which is a hollow columnar body and at least one end of which is an open end. The insert is fixed in the through hole of the glass body. It is possible to obtain direct connection between the vehicle window glass and the large-size irregular decoration part with the cooperation of the through hole on the glass body and the insert in the through hole. This connection ensures positioning accuracy and fixing reliability and can be widely applied to various occasions.

19 Claims, 3 Drawing Sheets

(51) Int. Cl.
  *B29C 45/14* (2006.01)
  *B29L 31/30* (2006.01)

(58) Field of Classification Search
  CPC .. B60J 10/70; B29L 2031/3052; B60R 13/04; B60R 13/043; B29C 45/14491
  See application file for complete search history.

(56) References Cited

U.S. PATENT DOCUMENTS

| | | | | |
|---|---|---|---|---|
| 7,246,840 | B2* | 7/2007 | Gates | B60J 1/1884 |
| | | | | 292/341.15 |
| 9,067,622 | B2* | 6/2015 | Hennion | B62D 25/06 |
| 2004/0155391 | A1* | 8/2004 | Izabel | B60S 1/0416 |
| | | | | 267/140.13 |
| 2005/0039316 | A1* | 2/2005 | Dolan | B60J 10/30 |
| | | | | 29/450 |
| 2015/0258876 | A1* | 9/2015 | Kondo | B60J 1/007 |
| | | | | 296/146.15 |
| 2018/0244135 | A1* | 8/2018 | Luo | B60J 1/02 |
| 2022/0032754 | A1* | 2/2022 | Kimura | B60J 5/0402 |
| 2022/0114624 | A1* | 4/2022 | Jain | G06F 40/279 |
| 2022/0169096 | A1* | 6/2022 | Yu | B29C 45/14491 |
| 2022/0332263 | A1* | 10/2022 | Goerse | B60R 13/005 |
| 2022/0355654 | A1* | 11/2022 | Baratin | B60J 10/77 |
| 2023/0001863 | A1* | 1/2023 | Martino | B60R 13/04 |

FOREIGN PATENT DOCUMENTS

| | | |
|---|---|---|
| CN | 207374068 U | 5/2018 |
| CN | 108099554 A | 6/2018 |
| CN | 208035900 U | 11/2018 |
| DE | 44 16 348 A1 | 6/1995 |
| DE | 196 51 649 C2 | 11/2002 |
| FR | 2 953 174 A1 | 6/2011 |
| JP | 2006-175601 A | 7/2006 |

OTHER PUBLICATIONS

Extended European Search Report as issued in European Patent Application No. 20795656.6, dated Nov. 30, 2022.

* cited by examiner

VEHICLE WINDOW GLASS, VEHICLE WINDOW GLASS ASSEMBLY AND MANUFACTURING PROCESS THEREOF

CROSS-REFERENCE TO RELATED APPLICATIONS

This application is the U.S. National Stage of PCT/CN2020/086300, filed Apr. 23, 2020, which in turn claims priority to Chinese patent application number 201910342669.1 filed Apr. 26, 2019. The content of these applications are incorporated herein by reference in their entireties.

FIELD OF THE INVENTION

The present disclosure generally relates to the field of production of vehicle components, in particular to a vehicle window glass, a vehicle window glass assembly and a manufacturing process thereof.

BACKGROUND OF THE INVENTION

With the rapid development of the automobile industry, the appearance of vehicles is constantly updated to meet the preferences of different consumers from all walks of life. Especially for the vehicle windows, the modeling design is changing more and more, resulting in more and more limited design space for fixing the vehicle windows and decoration parts. The rising trend is that it is necessary to connect and fix large-sized irregularly shaped decoration parts with the vehicle window glass, such as connecting and fixing decoration bright trims or D-pillar decoration plates with the rear corner window glasses. For the D-pillar decoration plates, there is a growing tendency to directly fix the D-pillar decoration plates to the corner window glasses and then to the vehicle body together, instead of separately fixing them to the white vehicle body.

In the prior art, two ways are usually adopted to connect the vehicle window glass and the decoration part, namely, one-piece injection molding and final assembly. The one-piece injection molding refers to placing the decoration part and the glass into a mold together, and injecting molten injection molding material for forming an encapsulation so as to form the glass, the decoration part and the encapsulation into a whole. In this way, it is difficult to control the material selection, the size of the mold, as well as the size and shape of the decoration part. For some decoration parts such as the D-pillar decoration plates or large-size irregular decoration bright trims, even though the feasibility of materials is not considered, the large size of the decoration parts makes it difficult to put them into the mold and make them injected together with the glass to form a whole.

The final assembly refers to providing the decoration part and the glass respectively, and then fixing the decoration part to the glass. When the final assembly process is adopted, the decoration part needs to be positioned on the glass first, and then the decoration part is reliably fixed on the glass. In the prior art, the positioning of the decoration part and the glass is usually realized via fixture positioning process or manipulator positioning process. However, the fixture positioning process requires not only additional labor, but also additional positioning tools, which will result in additional production costs. Similarly, the manipulator positioning process will also lead to additional production costs

SUMMARY OF THE INVENTION

The present disclosure aims to solve the problems existing in the prior art, and provides a vehicle window glass or a vehicle window glass assembly, which provides more feasibility in design and products on glass with holes, and is especially beneficial to directly fix the glass and the large-size irregular decoration part.

To this end, according to one aspect of the present disclosure, a vehicle window glass is provided. The vehicle window glass comprises a glass body provided with a through hole; and an insert which is a hollow columnar body and at least one end of which is an open end. The insert is fixed in the through hole of the glass body.

By adopting such solution, the decoration part can be positioned/pre-fixed/temporarily fixed on the glass body by the through hole on the glass body. Compared with the positioning process in the prior art, this solution is simple, fast, reliable and low in cost. On the one hand, the hole in the glass body is easy to be realized by drilling; on the other hand, the decoration part and the glass body can be accurately positioned by the through hole, and the operation is simple and fast. In addition, it can also save labor and material costs.

Moreover, the insert provided in the through hole can not only further improve the positioning accuracy, but also meet the requirements of diversified fixing processes of the decoration part and the glass body.

According to the above technical concept, the present disclosure may further comprise any one or more of the following alternative embodiments.

In some alternative embodiments, the insert is fixed in the through hole of the glass body by injection molding.

In some alternative embodiments, the open end of the insert has a fixing portion extending radially outward and perpendicular to the columnar body so that the insert is fixed in the through hole of the glass body.

In some alternative embodiments, both ends of the insert are open ends.

In some alternative embodiments, one end of the insert is an open end and the other end is a closed end.

In some alternative embodiments, one end of the insert has a reinforcing portion extending radially outward and perpendicular to the columnar body.

In some alternative embodiments, at least a portion of the open end and the fixing portion of the insert is an elastically deformable element.

In some alternative embodiments, the material for manufacturing the insert comprises but is not limited to metal, acrylonitrile butadiene styrene, polypropylene or polybutylene terephthalate.

According to another aspect of the present disclosure, a vehicle window glass assembly is provided. The vehicle window glass assembly comprises a vehicle window glass comprising a glass body, the glass body provided with a through hole; and a decoration part fixed to the vehicle window glass, the decoration part comprising a body and a protruding structure arranged on the body, and the protruding structure corresponds to the through hole; wherein the protruding structure is inserted into the through hole so that the decoration part is positioned in the glass body. In some alternative embodiments, the vehicle window glass is a vehicle window glass as described above, which includes a glass body and an insert.

In some alternative embodiments, the inner wall of the insert comprises a first clamping structure to fix the decoration part to the vehicle window glass.

In some alternative embodiments, at least a portion of the first clamping structure is an elastically deformable element.

In some alternative embodiments, the edge of the decoration part comprises a second clamping structure to fix the decoration part to the vehicle window glass.

In some alternative embodiments, the protruding structure of the decoration part protrudes from the edge of the through hole, and the decoration part is fixed to the vehicle window glass by fixing the protruding structure to the edge of the through hole.

In some alternative embodiments, the protruding structure of the decoration part is fixed to the edge of the through hole by welding to fix the decoration part to the vehicle window glass.

In some alternative embodiments, the decoration part is a decoration bright trim or a decoration plate.

According to another aspect of the present disclosure, a process for manufacturing a vehicle window glass as described above is provided. The process comprises the following steps of:
  i. providing a glass body having at least one through hole thereon;
  ii. providing at least one insert which is a hollow columnar body and at least one end of which is an open end; and
  iii. inserting the insert into the through hole and fixing the insert.

In some alternative embodiments, in the step iii, the insert is clamped and fixed in the through hole or fixed in the through hole by injection molding.

According to another aspect of the present disclosure, a process for manufacturing a vehicle window glass assembly as described above is provided. The process comprises the following steps of:
  a. providing a glass body having at least one through hole thereon;
  b. providing a decoration part comprising a body and a protruding structure arranged on the body, and the protruding structure corresponds to the through hole;
  c. inserting the protruding structure of the decoration part into the through hole to position the decoration part in the glass body; and
  d. fixing the decoration part to the glass body.

In some alternative embodiments, the following steps are further included after the step a and prior to the step b: a1. providing at least one insert which is a hollow columnar body and at least one end of which is an open end; and a2. inserting the insert into the through hole and fixing the insert.

In some alternative embodiments, in the step d, the decoration part is fixed to the glass body by a first clamping structure provided on the inner wall of the insert.

In some alternative embodiments, in the step d, the decoration part is fixed to the glass body by a second clamping structure provided at the edge of the decoration part.

In some alternative embodiments, in the step d, the decoration part is fixed to the glass body by fixing the protruding structure to the edge of the through hole.

In some alternative embodiments, in the step d, the protruding structure of the decoration part is fixed to the edge of the through hole by welding.

Compared with the structural design and assembly process in the prior art, the vehicle window glass of the present disclosure makes it possible to directly connect the vehicle window glass with the large-size irregular decoration part via the cooperation of the through hole on the glass body and the insert in the through hole. This connection manner ensures positioning accuracy and fixing reliability and can be widely applied to various occasions. In summary, the vehicle window glass assembly of the present disclosure has at least the following advantages:

1. The through hole provided on the glass body can provide positioning/pre-fixing/temporary fixing of the decoration part and avoid unfavorable factors caused by fixture positioning process or manipulator positioning process.
2. The structural design of the insert can provide the feasibility of directly assembling the decoration part, which can meet the diversified design requirements of the vehicle window glass assembly.
3. The vehicle window glass assembly of the present disclosure can be applied to the decoration parts of different designs without considering the size, shape or material of the decoration parts.
4. The vehicle window glass assembly of the present disclosure has high positioning precision, reliable fixation, greatly shortened assembly period and cost benefit.

BRIEF DESCRIPTION OF THE DRAWINGS

Other features and advantages of the present disclosure will be better understood by the following detailed description of alternative embodiments in conjunction with the accompanying drawings, in which similar reference numerals designate the same or similar components, wherein.

DETAILED DESCRIPTION OF EMBODIMENTS

The implementation and use of the embodiments are discussed in detail below. However, it should be understood that the specific embodiments discussed merely exemplify specific ways of implementing and using the present disclosure, and do not limit the scope of the present disclosure. When describing the structural positions of various components, such as the directions of upper, lower, top, bottom, etc., the description is not absolute, but relative. When the various components are arranged as shown in the figures, these directional expressions are appropriate, but when the positions of the various components in the figures would be changed, these directional expressions would also be changed accordingly.

In this context, "glass" refers to a kind of transparent semi-solid and semi-liquid substance, it is a silicate nonmetallic material which forms a continuous network structure when melting, and gradually increases in viscosity and hardens without crystallization during cooling.

In this context, "polymer" includes thermosetting polymer and thermoplastic polymer. Thermosetting polymer is produced by curing reaction of prepolymer in the presence of curing agent. Thermoplastic polymer is polymer that can be repeatedly heated to melt, molded in a softening or flowing state, and can maintain the shape of a mold after cooling. Curing agent is generally not required in the molding process of the thermoplastic polymer.

Figure 1:
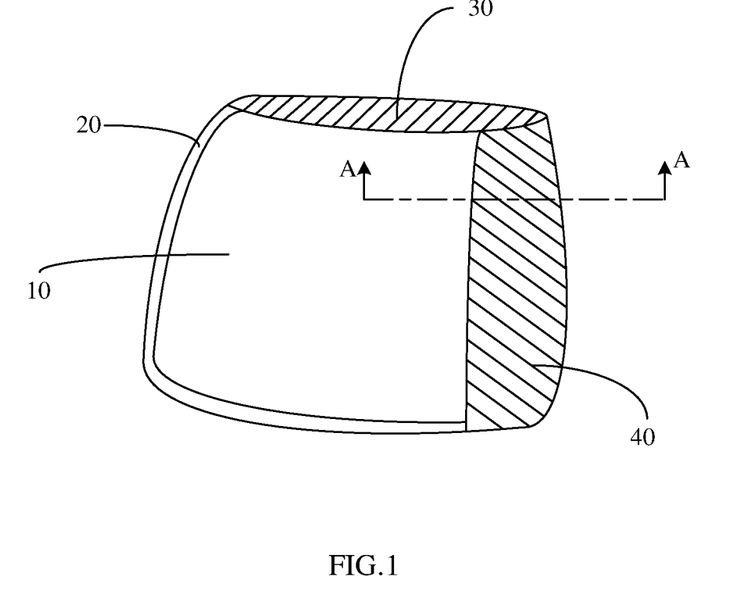
FIG. 1 is a schematic view of a vehicle window glass assembly according to one embodiment of the present disclosure, the vehicle window glass assembly has large-sized decoration part.

In the illustrated embodiments, the vehicle window glass assembly according to the present disclosure takes a corner window as an example. As shown in FIG. 1, the vehicle window glass assembly includes a vehicle window glass and a decoration part fixed to the vehicle window glass. In some embodiments, the vehicle window glass includes a glass body 10 and an encapsulation 20 covering the periphery of the glass body 10. In some embodiments, the periphery of the glass body 10 may also be free of encapsulation. As shown in FIG. 1, unlike the conventional vehicle window glass assembly, the size of a decoration part such as a decoration bright trim or a decoration plate is larger, and the decoration part may have different width sizes at different peripheries of the glass body. As shown in FIG. 1, the first decoration part 30 has a smaller width size and the second decoration part 40 has a larger width size. In this case, the conventional injection molding process for integrating the decoration part with the encapsulation cannot meet the assembly requirements anymore. Therefore, it is necessary to assemble the decoration part to the glass body, and thus the positioning and fixing between the decoration part and the glass body are particularly important.

Figure 2:
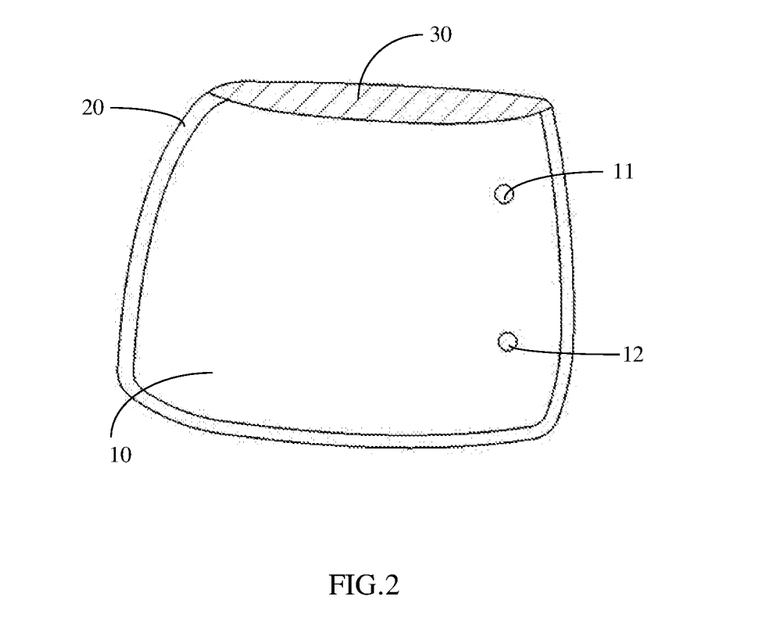
FIG. 2 is a schematic view of the vehicle window glass assembly of FIG. 1, in which the large-sized decoration part is removed to illustrate the through holes in the glass body.
Figure 5:
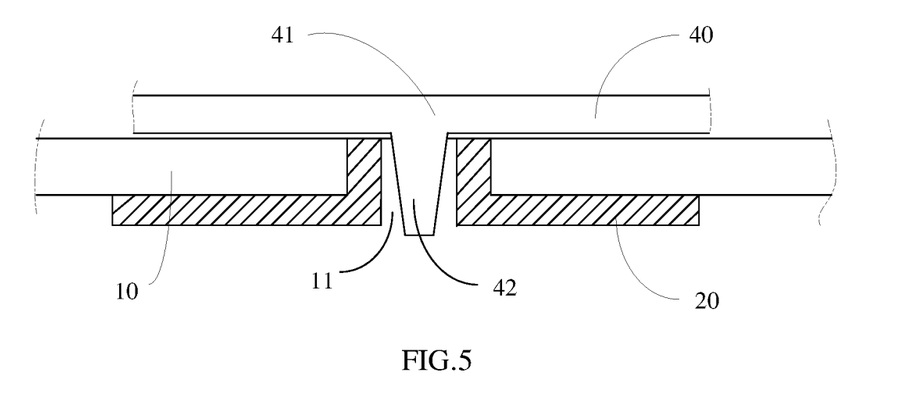
FIG. 5 is a schematic cross-sectional view taken along the line A-A in FIG. 1, illustrating an embodiment in which the decoration part is fixed to the glass body.

It has been realized that the positioning process of the decoration part and the glass body in the prior art is not satisfactory. For this reason, as shown in FIG. 2 and FIG. 5, in the vehicle window glass assembly of the present disclosure, the glass body 10 is provided with at least one through hole, for example, the first through hole 11 and the second through hole 12. It should be understood that one or more through holes can be correspondingly arranged on the glass body according to the actual design. The decoration part 40 includes a body 41 and a protruding structure 42 provided on the body 41, and the protruding structure 42 corresponds to, for example, the through hole 11. The protruding structure 42 can be inserted into the through hole 11 so that the decoration part 40 is positioned/pre-fixed/temporarily fixed on the glass body 10. In this way, the decoration part can be firstly positioned/pre-fixed/temporarily fixed to the glass body 10, and then the decoration part 40 can be fixed to the glass body 10, so that the decoration part can be permanently fixed to the glass body. In some embodiments, the decoration part may also be detachably fixed to the glass body. Alternatively, the protruding structure 42 may be fixedly connected, integrally formed or detachably connected with the body 41, preferably fixedly connected. In addition, it should be understood that the protruding structure 42 may take various forms for insertion into the through hole to realize positioning, including but not limited to, pin, post, hook, etc.

As shown in FIG. 5, in some embodiments, an encapsulation 20 may be provided at the through hole, thereby eliminating hole-position errors and improving positioning accuracy. The encapsulation can be formed during the glass body is subjected to the injection molding process with envelope material, and can be made of the same or similar materials as the envelope material. Therefore, the encapsulation at the through hole can be also described as the envelope. It should be understood that the encapsulation can also be referred to as "sealing material", which refers to the material, usually thermoplastic polymer, injected into a mold in a molten state during the injection molding process of the vehicle window glass assembly, which plays a sealing role and can reduce wind noise and ensure good appearance. The thermoplastic polymer may be, for example, rubber, composite material or other materials that can be used for sealing, including but not limited to polyurethane (PU), thermoplastic elastomer (TPE), ethylene propylene diene monomer (EPDM), thermoplastic vulcanizate (TPV), fluororubber, silicone rubber, styrene-butadiene rubber, nitrile rubber, polyvinyl chloride (PVC), polypropylene (PP), polyurethane rubber, acrylate rubber, styrene thermoplastic elastomer (SEBS+PP), polysulfide rubber, polymethyl methacrylate (PMMA).

According to actual requirements, the encapsulation 20 can cover the inner wall of the through hole 11, or the inner wall of the through hole 11 and the lower edge/lower periphery of the through hole, or can also cover the inner wall, the lower periphery of the through hole and the upper edge/upper periphery of the through hole, thereby meeting different strength requirements and structural design requirements.

Figure 3:
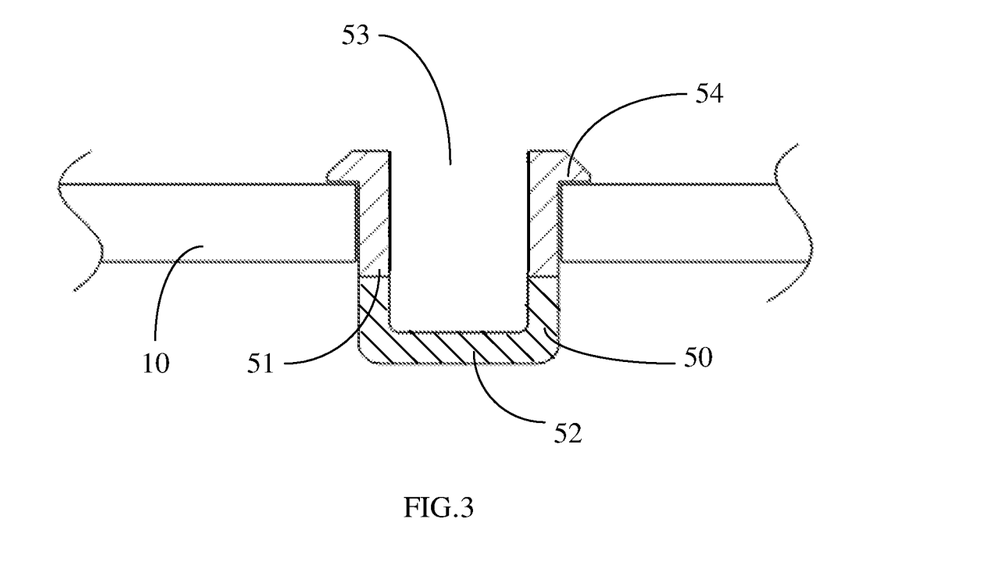
FIG. 3 is a schematic view of an insert according to one embodiment of the present disclosure, the insert is fixed to the glass body.

According to the present disclosure, an insert is preferably included in the through hole of the glass body 10. Referring to FIG. 3, the through hole 11 is provided with an insert 50, which may be a hollow columnar body and at least one end is an open end. With the insert 50 in the through hole 11, it can not only eliminate hole-position errors and increase positioning accuracy, but also design the structure of the insert correspondingly depending on the fixing manner of the decoration part and the glass body, so that the glass body is suitable for various decoration parts, especially large-size irregular decoration parts, thereby providing more design choices for fixing the decoration part and the glass body.

In some embodiments, the insert 50 can be directly fixed in the through hole by integral injection molding. Alternatively, the insert can be separately injection molded and then fixed in the through hole by bonding or clamping.

In some embodiments, the open end 53 of the insert 50 has a fixing portion 54 extending radially outward and perpendicular to the columnar body 51 so that the insert can be directly fixed in the through hole 11 of the glass body.

In some embodiments, the insert 50 can be provided with both ends as open ends. This design enables the protruding structure 42 of the decoration part 40 to protrude from the edge of the through hole. For example, as shown in FIG. 5, the protruding structure 42 can protrude from the lower edge of the through hole 11, so that the decoration part can be fixed to the vehicle window glass by welding, clamping or bonding. In addition, with such fixing manner, if there is no insert, in order to satisfy that the protruding structure 42 of the decoration part 40 can pass through the through hole after the encapsulation, it is usually necessary to provide a corresponding metal protruding structure in the injection mold to leave a space in the through hole for accommodating the protruding structure 42 of the decoration part 40 after the injection molding. However, since the protruding structure 42 of the decoration part 40 is usually thin, the corresponding metal protruding structure provided in the mold is also thin, thus being easily damaged after opening and closing the mold many times. In the present disclosure, this problem can be solved by providing the insert 50. Specifically, in the injection molding process, a sealing block can be provided at the open end of the insert to prevent the injection molding material from infiltrating. Accordingly, there is no need to provide a corresponding metal protruding structure in the mold. Therefore, by introducing the insert into the through hole, the mold can be effectively protected and the service life of the mold can be prolonged.

In some embodiments, the insert 50 can be arranged as shown in FIG. 3 with one end being the open end 53 and the other end being a closed end 52. The open end 53 can accommodate the protruding structure 42 of the decoration part 40, and the closed end 52 can play a waterproof role, thereby increasing the sealing performance of the vehicle window glass.

Figure 6:
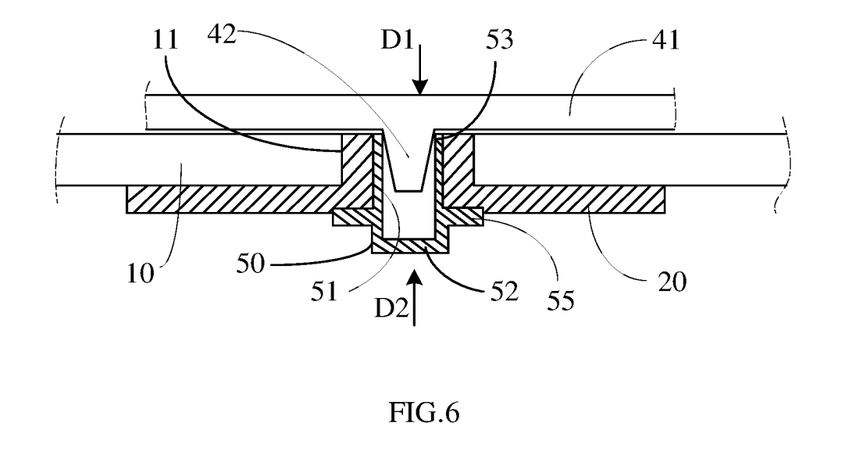
FIG. 6 is similar to FIG. 5, illustrating another embodiment in which the decoration part is fixed to the glass body.

In some embodiments, one end of the insert 50 can have a reinforcing portion 55 extending radially outward and perpendicular to the columnar body 51. As shown in FIG. 6, the reinforcing portion 55 can be at least partially covered by the encapsulation 20 to further reinforce the connection between the insert and the glass body.

In some embodiments, the insert 50 can be made of metal or polymer. The polymer is preferably a high temperature resistant polymer, which includes but is not limited to PP, acrylonitrile-butadiene-styrene (ABS), polybutylene terephthalate (PBT), polyoxymethylene (POM), polystyrene (PS), PMMA, polyvehiclebonate (PC), polyethylene terephthalate (PET), polyphenylene ether (PPO) and the like.

Figure 4:
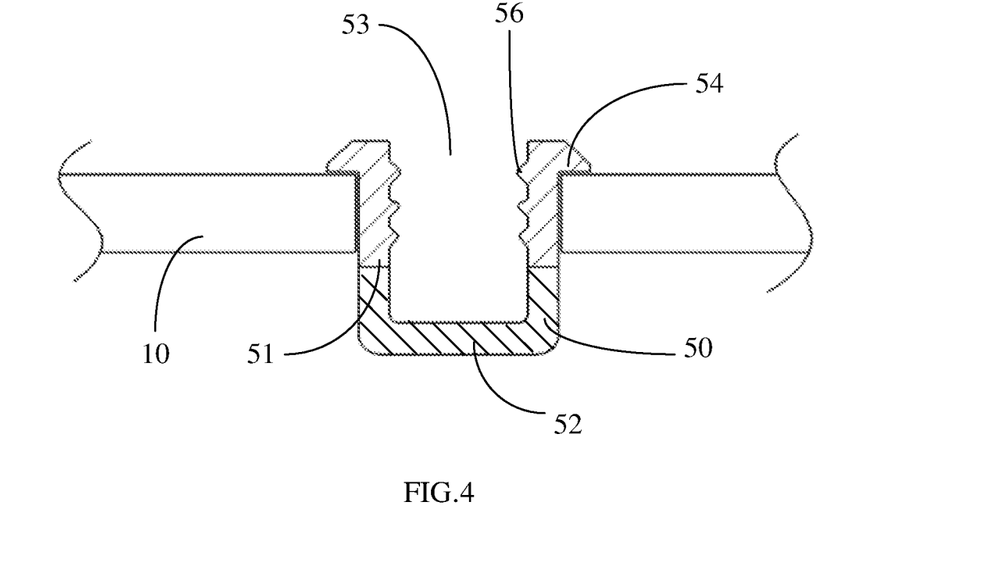
FIG. 4 is similar to FIG. 3, illustrating an insert according to another embodiment.

In some embodiments, at least a portion of the open end 53 and the fixing portion 54 of the insert 50 can be elastically deformable elements. For example, as shown in FIG. 3 or FIG. 4, the open end 53 and the fixing portion 54 can be provided as elastically deformable elements, which enable the insert to be inserted into the through hole. It should be understood that the elastic deformable element may be any material listed or not listed above as long as it has a certain degree of tensile strength.

In order to obtain reliable fixation of the decoration part and the glass body, in some embodiments, the inner wall of the insert 50 can be further provided with a first clamping structure corresponding to the protruding structure of the decoration part. The first clamping structure can be provided as any one or more of protrusion, rib, step and the like protruding from the inner wall. For example, as shown in FIG. 4, the inner wall of the insert 50 is provided with a plurality of ribs 56. It should be understood that, as shown in FIG. 6, the arrangement of the first clamping structure enables the decoration part 40 to be introduced into the insert 50 in the first direction D1 of the through hole 11, and at the same time, the first clamping structure can also form a stop for the decoration part 40 to prevent the decoration part 40 from being pulled out of the insert 50 in the opposite second direction D2. For example, the side of the rib 56 facing the open end 53 can be provided with an inclined guide surface, while the side facing the closed end 52 can be provided with barbs to prevent the protruding structure 42 from being pulled out.

In some embodiments, a second clamping structure, such as clamp, buckle, claw, clip, etc., can be provided at the edge of the decoration part to fix the decoration part to the glass body.

In some embodiments, the protruding structure 42 of the decoration part can be configured as protruding from the edge of the through hole 11. As shown in FIG. 5, the protruding structure 42 can protrude from the lower edge of the through hole 11. In this way, the decoration part 40 is fixed to the vehicle window glass by fixing the protruding structure 42 to the edge of the through hole 11. For example, the protruding structure 42 can be fixed to the vehicle window glass by welding, clamping or bonding.

Various alternative embodiments of the vehicle window glass and the vehicle window glass assembly according to the present disclosure have been described above, and the processes for manufacturing the vehicle window glass and the vehicle window glass assembly as described above will be described below.

First, the process for manufacturing a vehicle window glass according to the present disclosure includes the following steps of:
  i. providing a glass body having at least one through hole thereon;
  ii. providing at least one insert which is a hollow columnar body and at least one end of which is an open end; and
  iii. inserting the insert into the through hole and fixing the insert.

In some alternative embodiments, in the step iii, the insert can be clamped and fixed in the through hole, as shown in FIG. 3 or FIG. 4; or the insert can be fixed in the through hole by injection molding, as shown in FIG. 6.

In addition, the process for manufacturing the vehicle window glass assembly according to the present disclosure includes the following steps of:
  a. providing a glass body having at least one through hole thereon;
  b. providing a decoration part comprising a body and a protruding structure arranged on the body, and the protruding structure corresponds to the through hole;
  c. inserting the protruding structure of the decoration part into the through hole to position the decoration part in the glass body; and
  d. fixing the decoration part to the glass body.

In some alternative embodiments, the following steps can be further included after the step a and prior to the step b:
  a1. providing at least one insert which is a hollow columnar body and at least one end of which is an open end; and
  a2. inserting the insert into the through hole and fixing the insert.

Regarding the fixing process of the decoration part, in some alternative embodiments, in the step d, the decoration part is fixed to the glass body by a first clamping structure provided on the inner wall of the insert, as shown in FIG. 4.

In some alternative embodiments, in the step d, the decoration part is fixed to the glass body by a second clamping structure provided at the edge of the decoration part.

In some alternative embodiments, in the step d, the decoration part is fixed to the glass body by fixing the protruding structure of the decoration part to the edge of the through hole, as shown in FIG. 5.

In some alternative embodiments, the protruding structure of the decoration part is fixed to the edge of the through hole by welding.

It should be understood that the embodiments shown in the figures only illustrate the optional shapes, sizes and arrangements of various optional components of the vehicle window glass assembly according to the present disclosure; however, it is only for illustration and not limitation, and other shapes, sizes and arrangements may be adopted without departing from the spirit and scope of the present disclosure. In the various embodiments mentioned above, the glass body can be selected as ordinary glass, tempered glass, laminated glass, hollow glass, semi-tempered laminated glass, ultra-thin glass, flat glass or curved glass, etc. It can be understood that the shape, size, etc. of the glass body can also be changed correspondingly according to different application occasions and different appearance requirements. In addition, although a corner window is illustrated and described as an example, the vehicle window includes, but is not limited to, front windshield, rear windshield, front door window, rear door window, sunroof and the like.

The technical contents and technical features of the present disclosure have been disclosed above. However, it can be understood that those skilled in the art can make various changes and improvements to the above disclosed concept under the creative idea of the present disclosure, but all fall within the protection scope of the present disclosure. The above description of the embodiments is illustrative rather than limiting, and the scope of protection of the present disclosure is determined by the claims.

The invention claimed is:

1. A vehicle window glass, comprising:
   a glass body provided with a through hole, and
   an insert which is a hollow columnar body and at least one end of which is an open end,
   wherein the open end of the insert has a fixing portion extending radially outward on a surface of the glass body and perpendicular to the columnar body so that the insert is fixed in the through hole of the glass body.

2. The vehicle window glass according to claim 1, wherein the insert is fixed in the through hole of the glass body by injection molding.

3. The vehicle window glass according to claim 1, wherein both ends of the insert are open ends.

4. The vehicle window glass according to claim 1, wherein one end of the insert is an open end and the other end is a closed end.

5. The vehicle window glass according to claim 1, wherein one end of the insert has a reinforcing portion extending radially outward and perpendicular to the columnar body.

6. The vehicle window glass according to claim 1, wherein at least a portion of the open end and the fixing portion of the insert is an elastically deformable element.

7. The vehicle window glass according to claim 1, wherein the material for manufacturing the insert comprises metal, acrylonitrile butadiene styrene, polypropylene or polybutylene terephthalate.

8. A process for manufacturing a vehicle window glass according to claim 1, wherein the process comprises the following steps of:
   i. providing a glass body having at least one through hole thereon;
   ii. providing at least one insert which is a hollow columnar body and at least one end of which is an open end, the open end of the insert having a fixing portion extending radially outward on a surface of the glass body and perpendicular to the columnar body so that the insert is fixed in the through hole of the glass body, and
   iii. inserting the insert into the through hole and fixing the insert.

9. The process according to claim 8, wherein in step iii, the insert is clamped and fixed in the through hole or fixed in the through hole by injection molding.

10. A vehicle window glass assembly, comprising:
    a vehicle window glass comprising a glass body, the glass body provided with a through hole, and
    a decoration part fixed to the vehicle window glass, the decoration part comprising a body and a protruding structure arranged on the body, and the protruding structure corresponds to the through hole,
    wherein the protruding structure is inserted into the through hole so that the decoration part is positioned in the glass body, and
    wherein
    the vehicle window glass comprises an insert which is a hollow columnar body and at least one end of which is an open end, the insert is fixed in the through hole of the glass body, and inner wall of the insert comprises a first clamping structure to fix the decoration part to the vehicle window glass, or
    an edge of the decoration part comprises a second clamping structure to fix the decoration part to the vehicle window glass, or
    the protruding structure of the decoration part protrudes from the edge of the through hole, and the decoration part is fixed to the vehicle window glass by fixing the protruding structure to the edge of the through hole.

11. The vehicle window glass assembly according to claim 10, wherein at least a portion of the first clamping structure is an elastically deformable element.

12. The vehicle window glass assembly according to claim 10, wherein the protruding structure of the decoration part is fixed to the edge of the through hole by welding to fix the decoration part to the vehicle window glass.

13. The vehicle window glass assembly according to claim 10, wherein the decoration part is a decoration bright trim or a decoration plate.

14. A process for manufacturing a vehicle window glass assembly according to claim 10, wherein the process comprises the following steps of:
    a. providing a glass body having at least one through hole thereon;
    b. providing a decoration part comprising a body and a protruding structure arranged on the body, and the protruding structure corresponds to the through hole;
    c. inserting the protruding structure of the decoration part into the through hole to position the decoration part in the glass body; and
    d. fixing the decoration part to the glass body,
    wherein
    the process further comprises the following steps after step a and prior to step b: a1. providing at least one insert which is a hollow columnar body and at least one end of which is an open end, and a2. inserting the insert into the through hole and fixing the insert, and wherein in the step d, the decoration part is fixed to the glass body by a first clamping structure provided on the inner wall of the insert, or
    wherein in step d, the decoration part is fixed to the glass body by a second clamping structure provided at the edge of the decoration part, or
    wherein in step d, the decoration part is fixed to the glass body by fixing the protruding structure to the edge of the through hole.

15. The process according to claim 14, wherein the protruding structure of the decoration part is fixed to the edge of the through hole by welding.

16. The vehicle window glass assembly according to claim 10, wherein the protruding structure and the body of the decoration part are formed as a one-piece element.

17. The vehicle window glass assembly according to claim 10, wherein the decoration part is in a fixed relationship with the vehicle window glass when the protruding structure of the decoration part is inserted into the through hole.

18. The vehicle window glass assembly according to claim 10, wherein the first clamping structure fixes the decoration part to the vehicle window glass such that the decoration part is in fixed relationship with the vehicle window glass, or wherein the second clamping structure fixes the decoration part to the vehicle window glass such that the decoration part is in fixed relationship with the vehicle window glass, or wherein the protruding structure is fixed to the edge of the through hole such that the decoration part is in fixed relationship with the vehicle window glass.

19. The vehicle window glass assembly according to claim 10, wherein the protruding structure extends from a surface of the body.

* * * * *